(12) United States Patent
Nishikawa

(10) Patent No.: US 9,713,995 B2
(45) Date of Patent: Jul. 25, 2017

(54) POWER CONVERSION DEVICE

(75) Inventor: Katsuya Nishikawa, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 157 days.

(21) Appl. No.: 14/414,781

(22) PCT Filed: Aug. 6, 2012

(86) PCT No.: PCT/JP2012/069982
§ 371 (c)(1),
(2), (4) Date: Jan. 14, 2015

(87) PCT Pub. No.: WO2014/024243
PCT Pub. Date: Feb. 13, 2014

(65) Prior Publication Data
US 2015/0207427 A1 Jul. 23, 2015

(51) Int. Cl.
H02H 7/18 (2006.01)
B60R 16/03 (2006.01)
(Continued)

(52) U.S. Cl.
CPC ........ B60R 16/03 (2013.01); H02H 7/1225 (2013.01); H02H 9/002 (2013.01); H02M 1/36 (2013.01); H02M 7/48 (2013.01)

(58) Field of Classification Search
CPC ...... Y02T 10/7005; B60R 16/03; H02M 1/36; H02M 1/32; H02M 7/537; H02H 7/093; H02J 7/0081; H02P 6/001
(Continued)

(56) References Cited

U.S. PATENT DOCUMENTS

2008/0150369 A1* 6/2008 Suzuki .................. H02M 1/36
307/99
2013/0009624 A1* 1/2013 Tagome .................. B60L 3/00
323/350
2013/0121051 A1* 5/2013 Weiss ...................... H02H 7/09
363/131

FOREIGN PATENT DOCUMENTS

JP 3-269268 A 11/1991
JP 9-56167 A 2/1997
(Continued)

OTHER PUBLICATIONS

International Search Report (PCT/ISA/210) mailed on Nov. 6, 2012, by the Japanese Patent Office as the International Searching Authority for International Application No. PCT/JP2012/069982.
(Continued)

Primary Examiner — Nguyen Tran
(74) Attorney, Agent, or Firm — Buchanan Ingersoll & Rooney PC

(57) ABSTRACT

An inverter circuit has a main circuit for converting DC power into output electric power and outputting the output electric power, and a filter capacitor connected in parallel with the main circuit. A supply switching circuit has a contactor that switches between supplying and not supplying DC power to the inverter circuit. A control calculator outputs a supply signal causing the contactor to supply the DC power. A memory holds charge history information that indicates a history of incomplete charging of the filter capacitor. When a supply signal is outputted from the control calculator, a supply controller controls the contactor on the basis of the charge history information.

20 Claims, 7 Drawing Sheets

(51) Int. Cl.
   *H02H 7/122* (2006.01)
   *H02H 9/00* (2006.01)
   *H02M 7/48* (2007.01)
   *H02M 1/36* (2007.01)

(58) Field of Classification Search
   USPC .......... 307/9.1, 10.1, 10.7; 363/49, 50, 131;
   361/23; 320/166; 318/400.3, 139
   See application file for complete search history.

(56) References Cited

FOREIGN PATENT DOCUMENTS

| | | |
|---|---|---|
| JP | 2002-98725 A | 4/2002 |
| JP | 2002-332909 A | 11/2002 |
| JP | 2007-202250 A | 8/2007 |
| JP | 2009-195036 A | 8/2009 |

OTHER PUBLICATIONS

Written Opinion (PCT/ISA/237) mailed on Nov. 6, 2012, by the Japanese Patent Office as the International Searching Authority for International Application No. PCT/JP2012/069982.

* cited by examiner ated by the same signs. Also, repeated description of the same elements will be reduced or omitted.

POWER CONVERSION DEVICE

TECHNICAL FIELD

The present disclosure relates to a power conversion device.

BACKGROUND ART

A power conversion device installed on board an electric car or the like is equipped with an inverter circuit that includes a filter capacitor for stabilizing an input voltage, and a control calculator that controls the supply of electric power to the inverter circuit. For example, if damage causing a short-circuit or the like exists in the inverter circuit, the filter capacitor may not be charged even if power is supplied to the inverter circuit. If electric power continues to be supplied to the inverter circuit in this state, there is a possibility that the damage in the inverter circuit will spread. For this reason, the control calculator, after detecting incomplete charging of the filter capacitor, restricts the supply of electric power to the inverter circuit.

Generally, if some kind of malfunction occurs in the control calculator, the control calculator is restarted by an instruction from a control calculation monitor that monitors the operation of the control calculator. Even if the control calculator have been restricting the supply of electric power to the inverter circuit before being restarted, the restarted control calculator will supply electric power to the inverter circuit unless the state before the restart is saved. Since the inverter circuit is still in a damaged state, there is a possibility that the damage in the inverter circuit will spread.

Patent Literature 1 proposes technology that holds information for setting an off state in a memory. If this technology is applied to a power conversion device, information indicating that the control calculator has detected incomplete charging of the filter capacitor is held in the memory. If the restarted control calculator is operating normally, by referencing the memory, the control calculator is able to restrict the supply of electric power to the inverter circuit immediately even after restarting.

CITATION LIST

Patent Literature

Patent Literature 1: Unexamined Japanese Patent Application Kokai Publication No. 2009-195036.

SUMMARY OF INVENTION

Technical Problem

However, if the control calculator is unable to resume normal operation even after restarting, the supply of electric power to the inverter circuit may not be restricted on the basis of the information in the memory. For this reason, there is a risk that electric power will be supplied to the inverter circuit, and the damage in the inverter circuit will spread.

The present disclosure has been devised in light of the above circumstances, and takes as an objective to provide a power conversion device capable of preventing a spread of damage in the inverter circuit, even if a malfunction occurs in the control calculator.

Solution to Problem

In order to achieve the above objective, a power conversion device according to the present disclosure is provided with:

an inverter circuit that comprises a main circuit that converts DC power into output electric power and outputs the output electric power, and a filter capacitor connected in parallel with the main circuit;

a supply switching circuit that comprises a contactor that switches between supplying and not supplying the DC power to the inverter circuit; and a controller that controls the supply switching circuit;

wherein the controller comprises a control calculator that outputs a supply signal causing the contactor to supply the DC power, a memory that holds charge history information comprising a history of incomplete charging in which a charge level of the filter capacitor does not become equal to or greater than a predetermined value after the supply signal is outputted from the control calculator, and a supply controller that controls the contactor on the basis of the charge history information when the supply signal is outputted from the control calculator.

Advantageous Effects of Invention

According to the present disclosure, when the supply signal is outputted from the control calculator, the contactor is controlled on the basis of the charge history information. For this reason, even if the control calculator has restarted due to a malfunction but is still unable to restore normal operation, the supply of electric power to the inverter circuit can be restricted during an incomplete charging state. Consequently, it becomes possible to prevent the spread of damage in the inverter circuit, even if a malfunction occurs in the control calculator.

DESCRIPTION OF EMBODIMENTS

Figure 1:
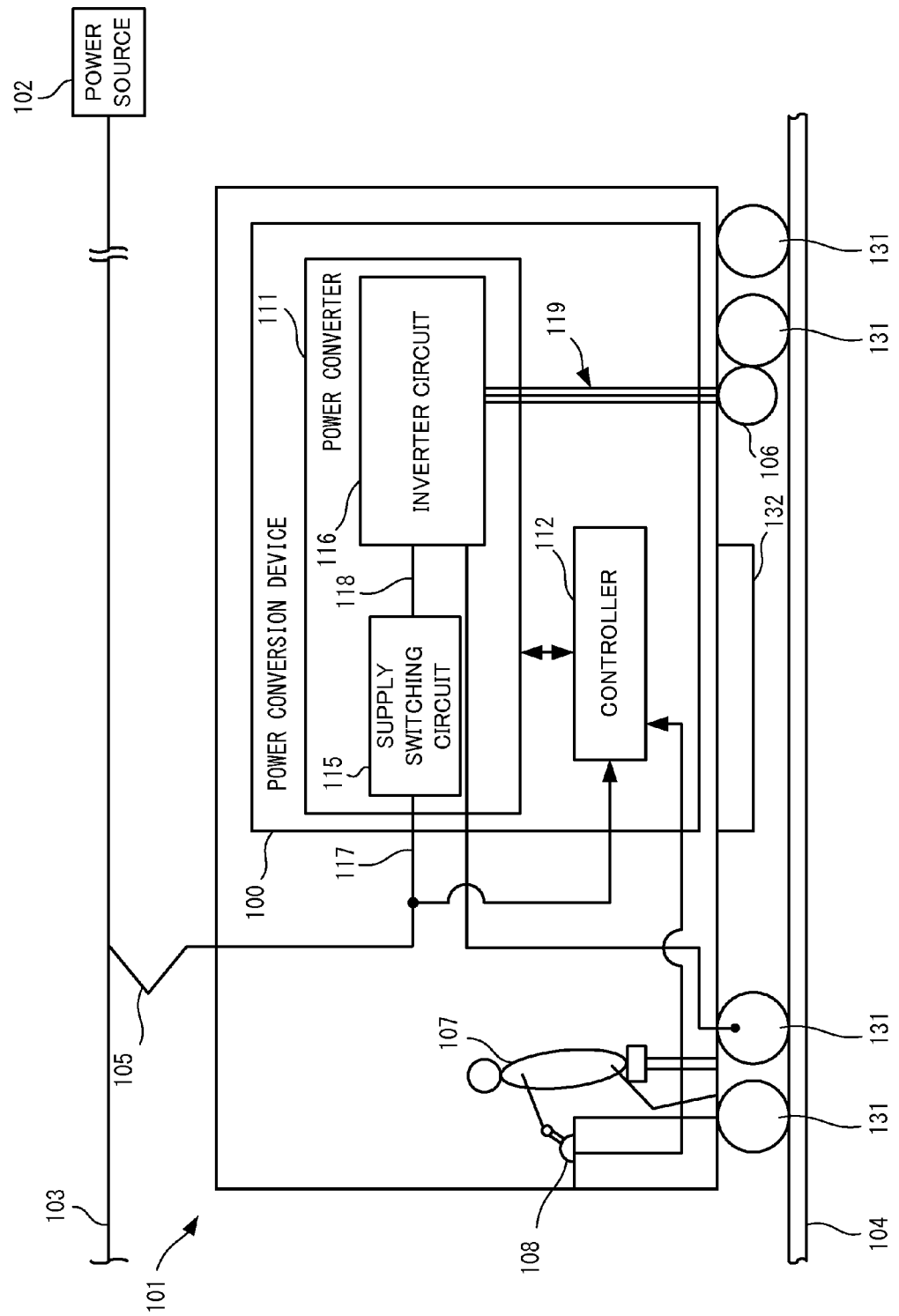
FIG. 1 is a diagram illustrating a configuration of an electric car according to Embodiment 1.

Hereinafter, exemplary embodiments of the present disclosure will be described with reference to the drawings. In the drawings, the same elements are denoted by the same signs. Also, repeated description of the same elements will be reduced or omitted.

Embodiment 1

As illustrated in FIG. 1, the power conversion device 100 according to Embodiment 1 of the present disclosure is installed on board an electric car 101. The electric car 101 is a train, electric locomotive, or the like that runs on a rail 104 by DC power supplied via an overhead line (overhead contact line) 103 from a power source 102. The supplied DC voltage is an arbitrary value such as 3 [kV] or 1.5 [kV], for example.

The power conversion device 100 is a device that converts supplied DC power into predetermined electric power and outputs the electric power.

The power conversion device 100 converts DC power supplied via a current collector 105 from the overhead line 103 into electric power for driving a motor 106. The power conversion device 100 outputs the converted electric power to the motor 106. The motor 106 is a three-phase AC induction motor, for example. But the motor 106 is not limited thereto, and may also be a motor such as a DC motor or a synchronous motor.

Note that when performing electric power conversion operation, the power conversion device 100 references a notch command outputted as a result of a motorman 107 or the like operating a master controller 108. Consequently, the electric car 101 is made to run according to the notch command.

As illustrated in the same drawing, the power conversion device 100 is equipped with a power converter 111 and a controller 112.

The power converter 111 is made up of a circuit group that operates under control by the controller 112. The power converter 111 is equipped with a supply switching circuit 115 and an inverter circuit 116. The supply switching circuit 115 is electrically connected to the current collector 105 via an intake wiring 117. The supply switching circuit 115 and the inverter circuit 116 are electrically connected via a connecting wiring 118. Via an output wiring 119, the inverter circuit 116 is connected to the motor 106 that is a load.

Figure 2:
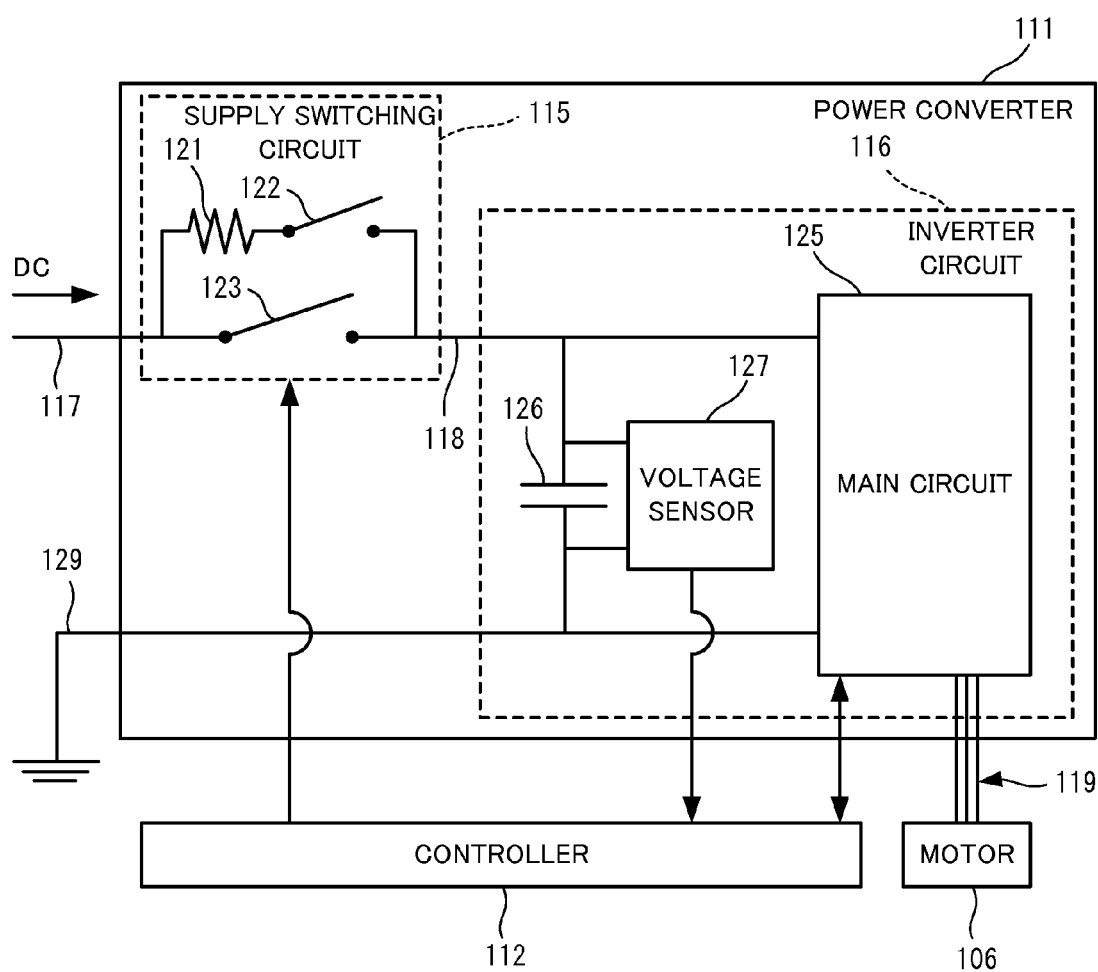
FIG. 2 is a diagram illustrating a configuration of a power converter according to Embodiment 1.

Specifically, as illustrated in FIG. 2, the supply switching circuit 115 is equipped with a resistor 121, a contactor 122, and a main switch 123, and the main switch 123 is provided in parallel with the resistor 121 and the contactor 122 between the intake wiring 117 and the connecting wiring 118. The resistor 121 has a fixed resistance value. The contactor 122 and the main switch 123 are electromagnetic switches or the like that switch opening and closing of each circuit comprised in parallel under control by the controller 112.

As illustrated in the same drawing, the inverter circuit 116 is equipped with a main circuit 125, a filter capacitor 126, and a voltage sensor 127.

The main circuit 125 is an electric circuit that converts supplied DC power into three-phase AC power under control by the controller 112. The main circuit 125 is made up of a high-voltage SiC semiconductor or the like, for example, thereby making a smaller size and power-saving possible.

The main circuit 125 is connected to the connecting wiring (input wiring) 118, a ground wiring 129, and the output wiring 119. The connecting wiring 118 inputs DC power outputted from the supply switching circuit 115 into the main circuit 125. The output wiring 119 outputs the electric power converted by the main circuit 125. The ground wiring 129 is a wiring that prescribes a reference voltage. Typically, since the wheels 131 (see FIG. 1) are made of metal and in contact with the metal rail 104, the ground wiring 129 is grounded by being connected to the wheels 131.

As illustrated in FIG. 2, the filter capacitor 126 is connected to the connecting wiring 118 and the ground wiring 129, and stabilizes the input voltage into the main circuit 125 by passing an electric current of at least a fixed frequency flowing through the connecting wiring 118.

The voltage sensor 127 is a sensor that measures the voltage between the electrodes of the filter capacitor 126. The voltage sensor 127 outputs a voltage signal indicating the measured voltage value to the controller 112.

The controller 112 runs on power from a battery 132 (see FIG. 1) that acts as onboard power source. The controller 112 controls the power converter 111 overall. For example, while the electric car 101 is travelling normally by receiving a supply of power from the overhead line 103, the controller 112 executes a normal travel process that controls the power converter 111 according to the notch command. In addition, the controller 112 executes a power supply process (later discussed in detail) for supplying electric power to the inverter circuit 116.

Figure 3:
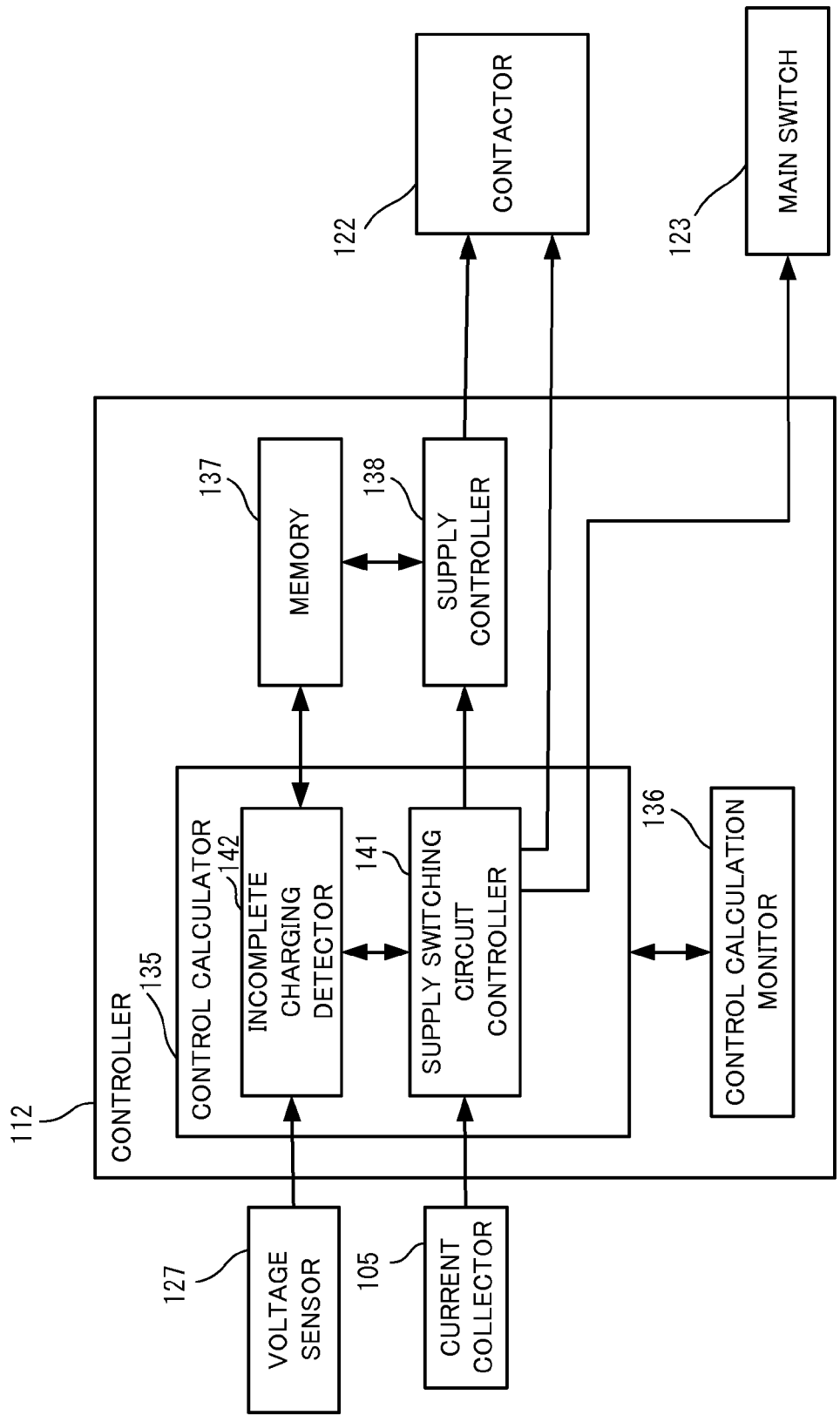
FIG. 3 is a diagram illustrating a configuration of a controller according to Embodiment 1.

Specifically, as illustrated in FIG. 3, the controller 112 is equipped with a control calculator 135, a control calculation monitor 136, a memory 137, and a supply controller 138.

For example, the control calculator 135 is a processor that executes a software program embedded in advance, and executes various processes including the normal travel process and the power supply process. As functions for executing the power supply process, the control calculator 135 is equipped with a supply switching circuit controller 141 and an incomplete charging detector 142.

The supply switching circuit controller 141 outputs a signal for controlling whether or not to supply DC power to the inverter circuit 116 via each of the contactor 122 and the main switch 123.

Specifically, the supply switching circuit controller 141 outputs to the supply controller 138 a supply signal for supplying the contactor 122, that is, supplying DC power to the inverter circuit 116 via the contactor 122. The supply switching circuit controller 141 outputs to the contactor 122 an open signal for opening (not supplying) the contactor 122. The supply switching circuit controller 141 outputs to the main switch 123 a connect signal for closing the main switch 123. The supply switching circuit controller 141 outputs to the main switch 123 a shutoff signal for opening the main switch 123.

The supply switching circuit controller 141 monitors an electric current flowing through the intake wiring 117 and a restarting of the control calculator 135, and outputs the open signal and the shutoff signal in a predetermined case. As a result, the contactor 122 and the main switch 123 are opened.

Herein, the predetermined case may be a case where an electric current no longer flows through the intake wiring 117 because the current collector 105 does not receive the electric power. To give specific examples, the predetermined case may be a case where a pantograph that acts as the current collector 105 is folded and separates from the overhead line 103, where the current collector 105 passes through a section of the overhead line 103, or where a power outage occurs.

Also, the predetermined case may be a case where the control calculator 135 may restart when the electric current flowing through the intake wiring 117 becomes an abnormal value due to such as a lightning strike. Other cases where the contactor 122 and the main switch 123 are opened may be determined as appropriate.

The incomplete charging detector 142 acquires the voltage signal from the voltage sensor 127, and detects incomplete charging of the filter capacitor 126 on the basis of the voltage indicated by the voltage signal. After detecting incomplete charging of the filter capacitor 126, the incomplete charging detector 142 outputs charge history information indicating that incomplete charging was detected to the memory 137.

Specifically, the incomplete charging detector 142 detects incomplete charging of the filter capacitor 126 when the charge percentage (%) does not become equal to or greater than a threshold value (for example, 90%) even after a predetermined time T (s) elapses after the supply signal is outputted from the supply switching circuit controller 141.

Herein, the charge percentage (%) is an example of a charge level, which is a value indicating how much the filter capacitor 126 is charged. The charge percentage (%) is a ratio of a voltage indicated by the voltage signal to a voltage indicating that the filter capacitor 126 is fully charged. Also, the threshold value is not limited to 90%, and may be set as appropriate.

The time T (s) may be appropriately set to time that is equal to or greater than time t (s) required to bring the filter capacitor 126 to a predetermined charge level in a case where there is no malfunction in the power converter 111. This time T (s) may be computed by the incomplete charging detector 142 on the basis of factors such as the voltage of the electric power supplied to the inverter circuit 116, a resistance value of the resistor 121, capacity of the filter capacitor 126, and a period of time required by a process that is executed from outputting the supply signal to switching the contactor 122 on.

The control calculation monitor 136 is a chip or the like that monitors whether or not the control calculator 135 is operating normally. When a malfunction in the control calculator 135 is detected, the control calculation monitor 136 makes the control calculator 135 restart. Malfunctions in the control calculator 135 may include those that occur during normal processes, such as the control calculator 135 becoming unable to reference data in its own memory or stagnation of a process, as well as those that occur due to an external factor such as thunder or shock.

The memory 137 stores charge history information. The memory 137 is made up of readable/writable non-volatile memory, such as flash memory, for example.

Charge history information according to the present embodiment indicates a flag associated with whether or not incomplete charging of the filter capacitor 126 is detected. Specifically, the charge history information indicates "1", which corresponds to incomplete charging of the filter capacitor 126 having been detected, or "0", which corresponds to incomplete charging of the filter capacitor 126 not having been detected.

After acquiring the supply signal from the supply switching circuit controller 141, the supply controller 138 references the charge history information in the memory 137. If the charge history information indicates that incomplete charging of the filter capacitor 126 is detected (that is, if the charge history information indicates "1"), the supply controller 138 restricts switching the contactor 122 on. In other words, the supply controller 138 opens the contactor 122.

If the charge history information indicates that incomplete charging of the filter capacitor 126 is not detected (that is, if the charge history information indicates "0"), the supply controller 138 switches the contactor 122 on.

The foregoing describes a configuration of an electric car 101 and an onboard power conversion device 100 according to the present embodiment.

Hereinafter, a power supply process executed by the electric car 101 and the power conversion device 100 according to the present embodiment will be described.

As discussed earlier, the power supply process is a process for supplying electric power to the inverter circuit 116. After the contactor 122 and the main switch 123 are opened by the supply switching circuit controller 141, the power supply process is executed in a case where the supply switching circuit controller 141 detects that an electric current is flowing normally through the intake wiring 117, or in a case where the supply switching circuit controller 141 detects that the control calculator 135 has restarted, for example.

Figure 4:
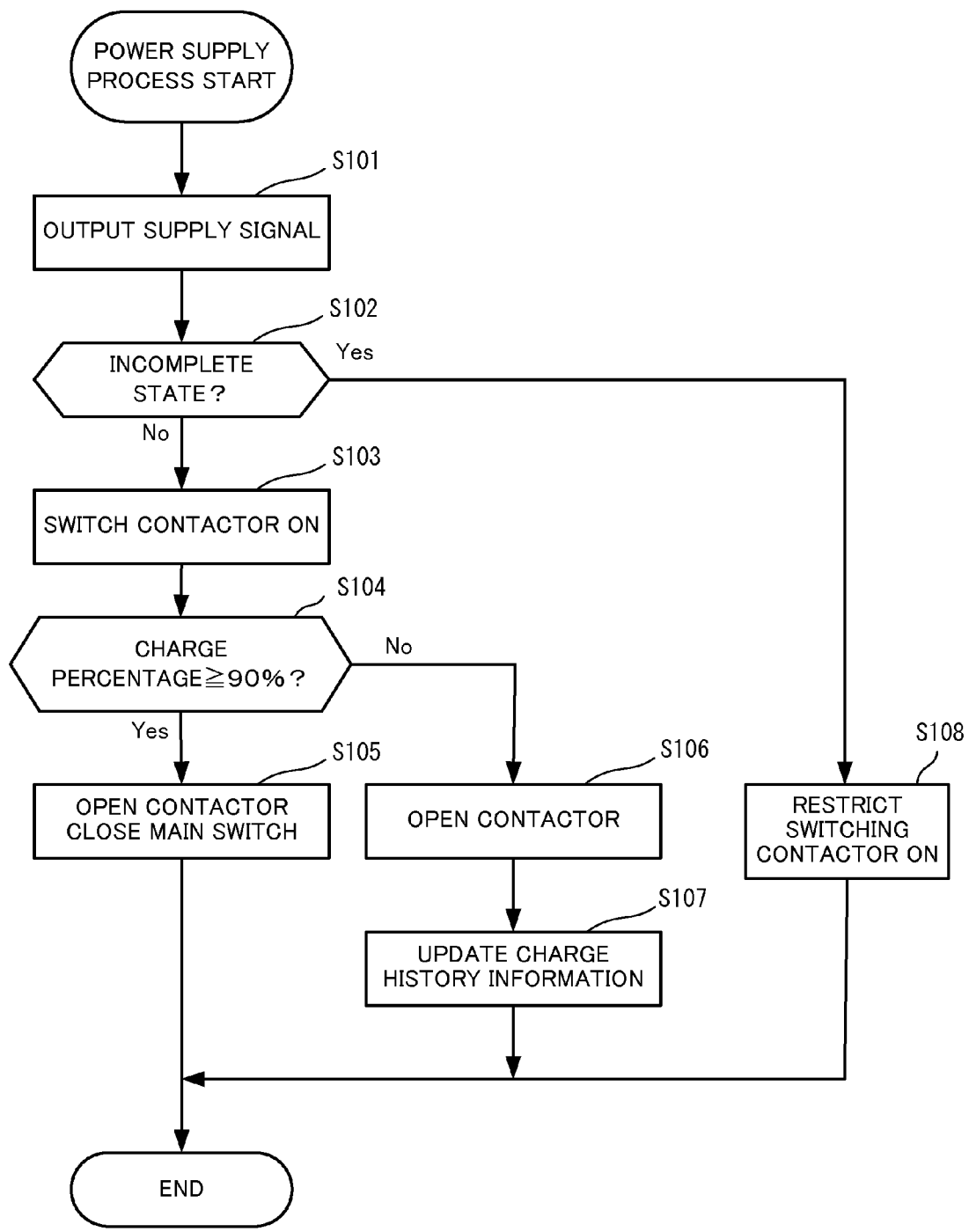
FIG. 4 is a flowchart illustrating a flow of a power supply process according to Embodiment 1.

As illustrated in FIG. 4, the supply switching circuit controller 141 outputs the supply signal to the supply controller 138 (step S101).

The supply controller 138 references the charge history information in the memory 137, and determines whether or not charging is in an incomplete state (step S102). Herein, an incomplete state refers to a state in which the filter capacitor 126 is not charged even after electric power having been supplied to the inverter circuit 116 via the connecting wiring 118.

If the charge history information indicates "0", or in other words, if the charge history information indicates that incomplete charging of the filter capacitor 126 has not been detected previously, the supply controller 138 determines that charging is not in an incomplete state (step S102; No).

The supply controller 138 switches the contactor 122 on (step S103). At this point, the main switch 123 is still open.

The incomplete charging detector 142 acquires the voltage signal from the voltage sensor 127 until T (s) elapses since the supply signal was outputted in step S101. On the basis of the voltage indicated by the voltage signal, the incomplete charging detector 142 determines whether or not the charge percentage of the filter capacitor 126 is equal to or greater than 90% (step S104).

Figure 5:
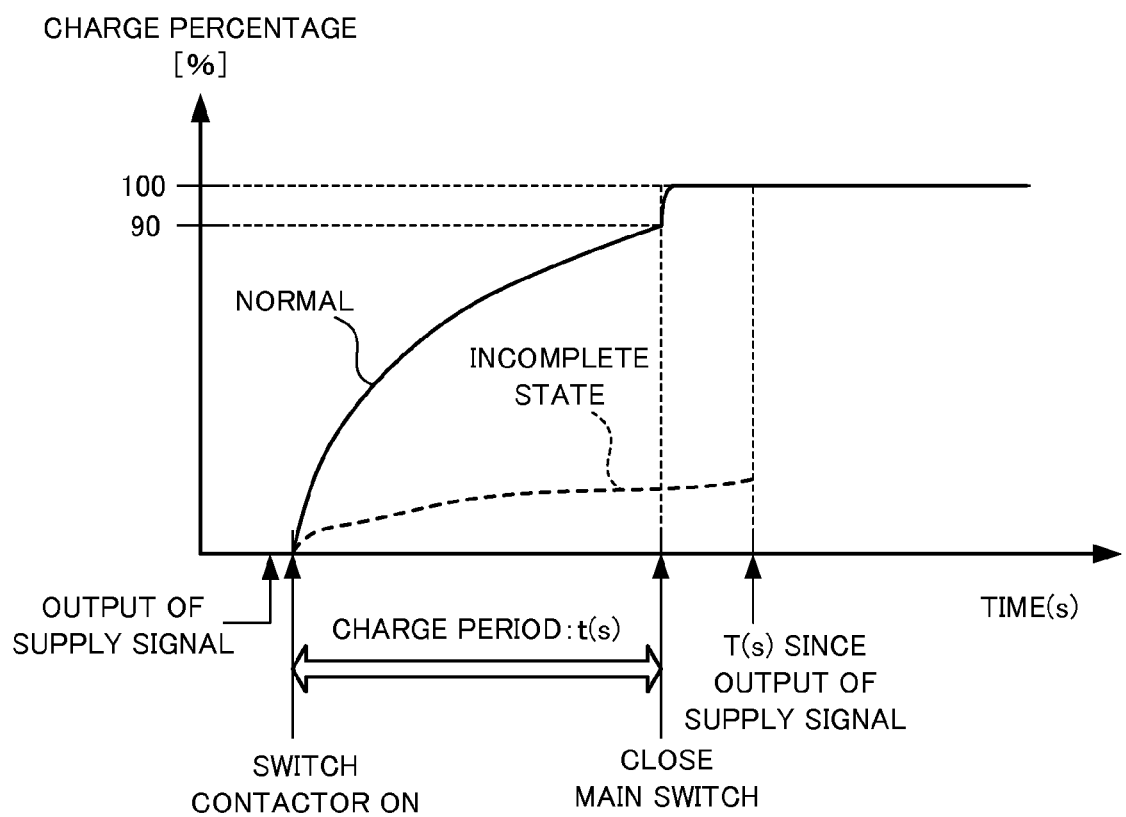
FIG. 5 is a diagram illustrating an example of change in a charge percentage over time in a normal case and an incomplete charging case.

For example, in the normal case, suppose that the filter capacitor 126 is charged up to 90% in a charge period t (s) after the contactor 122 is switched on, as indicated by the solid line in FIG. 5. The time T (s) is set to a length of time equal to or greater than the sum of t (s) and a period of time (s) that is required from outputting the supply signal in step S101 to switching the contactor 122 on in step S103. For this reason, if charging is not in an incomplete state, the filter capacitor 126 is charged to 90% or greater by the time T (s) elapses after the supply signal is outputted. In this case, the incomplete charging detector 142 determines that the charge percentage is 90% or greater (step S104; Yes).

If the charge percentage is determined to be 90% or greater (step S104; Yes), the supply switching circuit controller 141 receives a signal indicating the determination result from the incomplete charging detector 142, and outputs an open signal and a connect signal. As a result, the contactor 122 is opened, and the main switch 123 is closed (step S105). The controller 112 ends the power supply process.

In this way, the contactor 122 is switched on in a case of determining that charging is not in an incomplete state according to the charge history information. Consequently, since DC power passes from the intake wiring 117 through the resistor 121, a comparatively small electric current is input into the inverter circuit 116. Additionally, when the charge percentage of the filter capacitor 126 becomes equal to or greater than 90%, it is confirmed that charging is still not in an incomplete state, and the contactor 122 is opened while the main switch 123 is closed. Consequently, a large electric current that does not go through the resistor 121 can be supplied to the inverter circuit 116.

Meanwhile, if charging is in an incomplete state, the filter capacitor 126 is not charged to 90% or greater even after T (s) elapses after the supply signal is outputted, as indicated by the dashed line in FIG. 5, for example. Consequently, in this case, the incomplete charging detector 142 determines that the charge percentage is not 90% or greater (step S104; No).

If the charge percentage is determined to be not 90% or greater (S104; No), the supply switching circuit controller 141 outputs an open signal. As a result, the supply switching circuit controller 141 opens the contactor 122 (step S106). At this point, the main switch 123 is still open.

The incomplete charging detector 142 updates the charge history information in the memory 137 to "1" (step S107). As a result, the memory 137 stores an incomplete charge detected by the incomplete charging detector 142 as incomplete charge information. The controller 112 ends the power supply process.

In this way, the contactor 122 is opened when the charge percentage of the filter capacitor 126 does not become 90% or greater by the time T (s) elapses after the supply signal is outputted. Even if charging is determined to not be in an incomplete state according to the charge history information, when charging is currently in an incomplete state, a large electric power is not supplied to the inverter circuit 116. In other words, only a comparatively small electric current via the resistor 121 is input into the inverter circuit 116, thereby being able to prevent the spread of damage in the inverter circuit 116 as a result of a large inflowing electric current.

If the charge history information indicates "1", or in other words, if the charge history information indicates that incomplete charging of the filter capacitor 126 has been detected at least once, the supply controller 138 determines that charging is in an incomplete state (step S102; Yes).

The supply controller 138 restricts the supply via the contactor 122 (step S108). As a result, the contactor 122 stays open. At this point, the main switch 123 is also still open.

In this way, electric power is not supplied to the inverter circuit 116 in the case of determining that charging is in an incomplete state according to the charge history information. For example, if the charge history information is operated to be reset to "0" when the inverter circuit 116 is inspected or repaired, in a case where charging is determined to be in an incomplete state according to the charge history information, there is a high likelihood that charging is currently still in an incomplete state due to a short circuit or the like inside the inverter circuit 116, for example. Since even a small electric current via the resistor 121 is not supplied to the inverter circuit 116, the spread of damage in the inverter circuit 116 can be prevented.

According to the present embodiment, the memory 137 and the supply controller 138 are provided separately from the control calculator 135, and the supply controller 138 references charge history information in the memory 137 to determine whether or not charging is in an incomplete state. In a case of determining that charging is in an incomplete state, the supply controller 138 does not switch the contactor 122 on. Consequently, even if a malfunction occurs in the control calculator 135, the supply of electric power to the inverter circuit 116 is restricted by the supply controller 138, thus making it possible to prevent the spread of damage in the inverter circuit.

For example, if charging enters an incomplete state while the control calculator 135 is operating normally, and after that a malfunction occurs in the control calculator 135 due to some factors, if the control calculator 135 is unable to recover normally even after restarting, the control calculation monitor 136 repeatedly restarts the control calculator 135. As a result, the supply signal may be outputted repeatedly from the control calculator 135 every time the control calculator 135 restarts. If the contactor 122 is repeatedly closed and opened according to the supply signal, electric current via the resistor 121 is repeatedly supplied to the inverter circuit. The electric current via the resistor 121 is comparatively small, but if repeatedly input, there is a risk that damage in the inverter circuit 116 may spread.

According to the present embodiment, the memory 137 and the supply controller 138 are provided separately from the control calculator 135. Additionally, if charging enters an incomplete state while the control calculator 135 is operating normally, the charge history information in the memory 137 is updated to "1". For this reason, even if a malfunction later occurs in the control calculator 135 due to some factors, the control calculator 135 is repeatedly restarted, and the supply signal is repeatedly outputted, the supply controller 138 does not switch the contactor 122 on and keeps the contactor 122 open. Consequently, it becomes possible for the control calculator 135 to recover to normal operation as a result of the control calculation monitor 136 restarting the control calculator 135, while in addition, it becomes possible for the supply controller 138 to prevent the spread of damage in the inverter circuit 116 even if the control calculator 135 is unable to recover to normal operation.

Incomplete charging of the filter capacitor 126 is detected on the basis of the voltage signal from the voltage sensor 127. For this reason, it becomes possible to detect incomplete charging of the filter capacitor 126 with a simple configuration.

By adopting non-volatile memory for the memory 137, it becomes possible to hold the charge history information in the memory 137 even when the control calculator 135 is restarted. Also, it becomes possible to hold the charge history information in the memory 137 even if electric power supplied to the control calculator 135 and the memory 137 decreases due to a malfunction of the battery 132, for example.

Embodiment 2

In the present embodiment, it is determined whether or not charging is in an incomplete state on the basis of the number of times that incomplete charging has been detected.

The respective configurations of the electrical car and the power converter of the power conversion device according to the present embodiment are similar to the configurations of the electric car 101 and the power converter 111 according to Embodiment 1.

Figure 6:
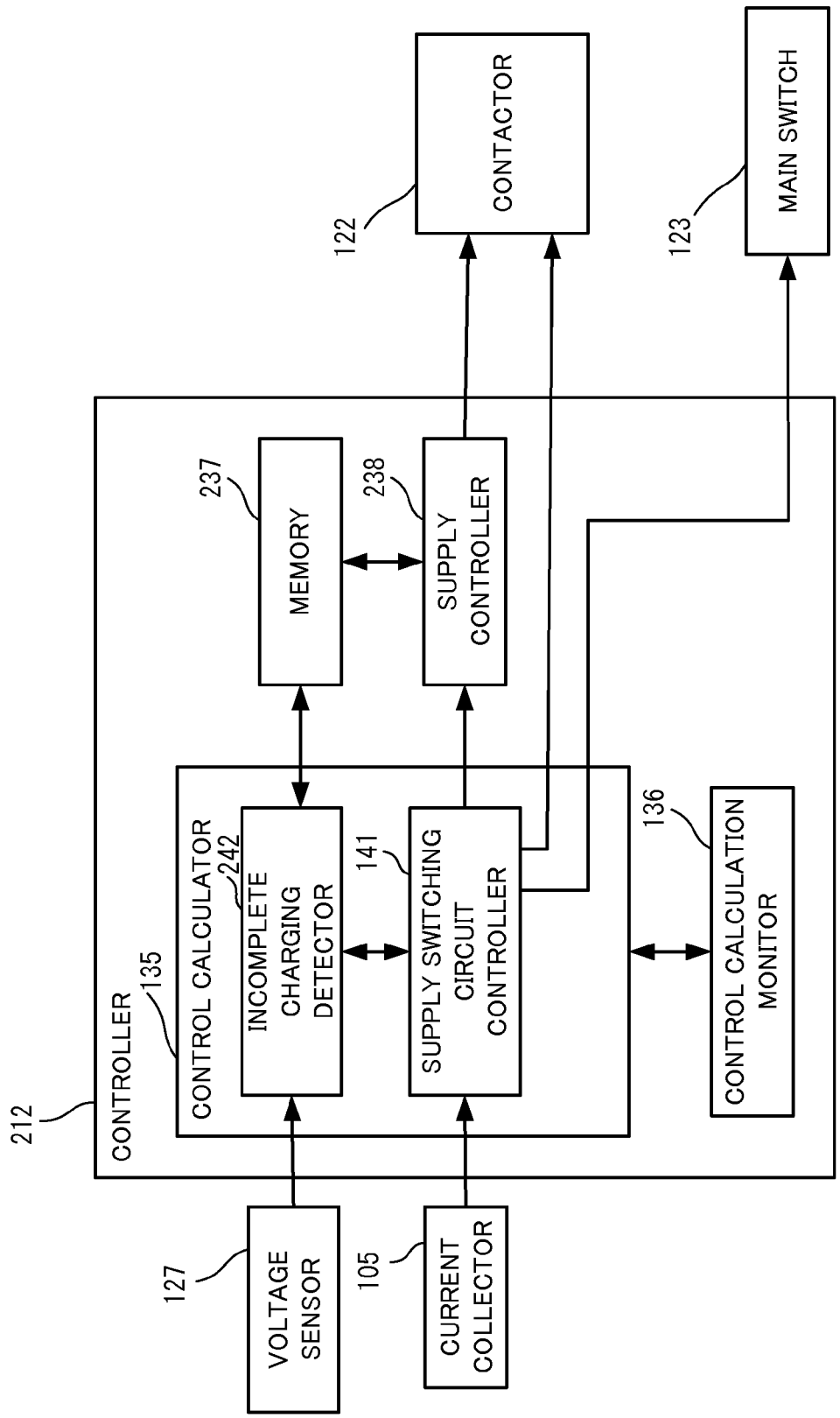
FIG. 6 is a diagram illustrating a configuration of a controller according to Embodiment 2.

As illustrated in FIG. 6, the controller 212 according to the present embodiment is equipped with a memory 237, a supply controller 238, and an incomplete charging detector 242 instead of the memory 137, the supply controller 138, and the incomplete charging detector 142 of the controller 112 according to Embodiment 1.

The memory 237 stores charge history information similarly to the memory 137 according to Embodiment 1. The charge history information according to the present embodiment indicates the number of times that the incomplete charging detector 142 has detected incomplete charging of the filter capacitor 126.

The supply controller 238, after acquiring the supply signal from the supply switching circuit controller 141, references the charge history information in the memory 237. If the charge history information indicates a number of times equal to or greater than a suitably determined threshold value N, the supply controller 238 restricts switching the contactor 122 on. In other words, the supply controller 238 opens the contactor 122. If the charge history information indicates a number of times less than the threshold value N, the supply controller 238 switches the contactor 122 on.

The incomplete charging detector 242 detects incomplete charging of the filter capacitor 126 on the basis of the voltage indicated by the voltage signal, similarly to the incomplete charging detector 142 according to Embodiment 1. After detecting incomplete charging of the filter capacitor 126, the incomplete charging detector 242 increments the number of times indicated by the charge history information by +1. The incomplete charging detector 242 outputs the charge history information indicating the incremented number of times to the memory 237.

The foregoing describes a configuration of an electric car and an onboard power conversion device according to the present embodiment. Hereinafter, a power supply process executed by the electric car and the power conversion device according to the present embodiment will be described.

Figure 7:
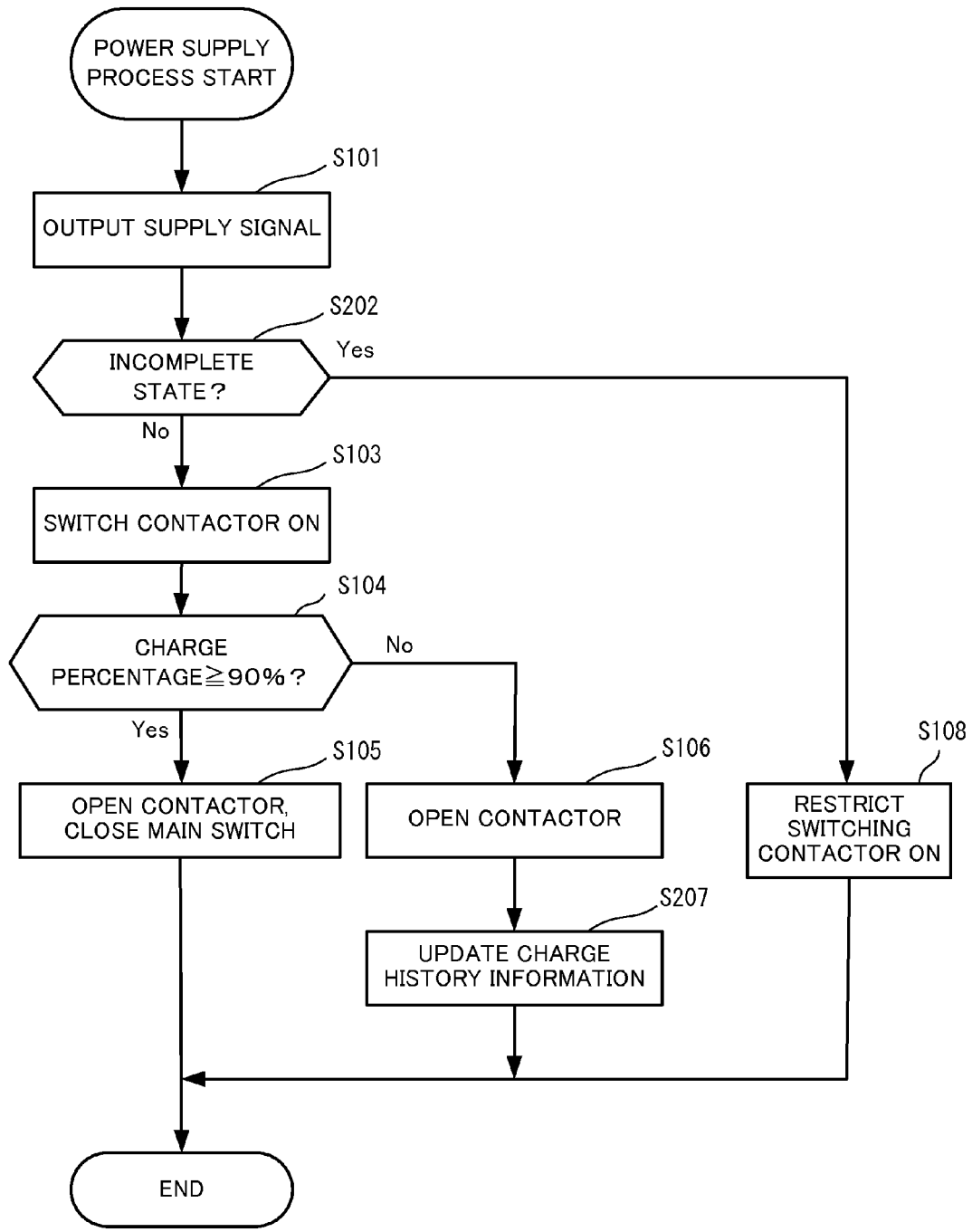
FIG. 7 is a flowchart illustrating a flow of a power supply process according to Embodiment 2.

As illustrated in FIG. 7, the power supply process according to the present embodiment includes a step S202 and a step S207 instead of the step S102 and the step S107 of the power supply process according to Embodiment 1 respectively.

The supply controller 238 references the charge history information in the memory 237, and determines whether or not charging is in an incomplete state (step S202). If the number of times indicated by the charge history information is less than N, the supply controller 238 determines that charging is not in an incomplete state (step S202; No). If the number of times indicated by the charge history information is equal to or greater than N, the supply controller 238 determines that charging is in an incomplete state (step S202; Yes).

The incomplete charging detector 242 updates the charge history information in the memory 237 to the number of times incremented by +1 (step S207). As a result, the memory 237 stores an incomplete charge detected by the incomplete charging detector 242 as incomplete charge information. The controller 212 ends the power supply process.

According to the present embodiment, similarly to Embodiment 1, the memory 237 and the supply controller 238 are provided separately from the control calculator 135, and the supply controller 238 references charge history information in the memory 237 to determine whether or not charging is in an incomplete state. In a case of determining that charging is in an incomplete state, the supply controller 238 does not switch the contactor 122 on. Consequently, even if a malfunction occurs in the control calculator 135, the supply of electric power to the inverter circuit 116 is restricted by the supply controller 238, thus making it possible to prevent the spread of damage in the inverter circuit.

According to the present embodiment, it is determined whether or not charging is in an incomplete state on the basis of the number of times that incomplete charging has been detected. Consequently, it is possible to prevent the restriction of switching the contactor 122 on due to determining that charging is in an incomplete state because of an incidental incomplete charging caused by temporary poor contact or the like, for example. For this reason, it becomes possible to prevent the spread of damage in the inverter circuit 116 while also preventing the restriction of supplying electric power even though the inverter circuit 116 is operable.

The foregoing thus describes embodiments of the present disclosure, but the present disclosure is not limited to these embodiments.

For example, the present disclosure may be applied to a power conversion device 100 that includes an inverter circuit. For this reason, the present disclosure may also be applied to an AC electric car and a power conversion device 100 installed on board an AC electric car.

For example, the charge history information may be information indicating a history of incomplete charging of the filter capacitor 126. For example, besides the information described in the embodiments, the charge history information may also be information indicating dates and times when incomplete charging of the filter capacitor 126 was detected. In this case, the supply controller 138 may determine whether or not charging is incomplete on the basis of whether or not there exists charge history information indicating dates and times in a predetermined period (for example, from the time of the last maintenance of the electric car 101 up to the present), on the basis of the number of pieces of charge history information indicating dates and times in the predetermined period, or the like.

For example, the control calculator 135, the control calculation monitor 136, the memory 137 or 237, and the supply controller 138 or 238 are each provided separately, and preferably insulated except for wiring that connects these structural elements. Consequently, the possibility of these structural elements being simultaneously damaged by a lightning strike or the like may be reduced, for example.

For example, the memory 137 or 237 and the supply controller 138 or 238 may run on an auxiliary power source separate from the battery 132. Consequently, even if a malfunction occurs in the control calculator 135 because of a drop in the supplied voltage from the battery 132, for example, the memory 137 or 237 and the supply controller 138 may be operable stably. As a result, it becomes possible to more reliably prevent switching the contactor 122 on even though the filter capacitor 126 is in an incomplete state in which charging is incomplete, and prevent the spread of damage in the inverter circuit.

For example, in the present embodiment, only the supply signal is configured to be outputted from the controller 112 or 212 via the supply controller 138 or 238, but the connect signal may also be outputted from the controller 112 or 212 via the supply controller 138 or 238. Consequently, in an incomplete state, it is possible to restrict not only the switching the contactor 122 on, but also the closing of the main switch 123. Consequently, the supply of electric power to the inverter circuit 116 in an incomplete state can be more reliably prevented, making it possible to more reliably prevent the spread of damage in the inverter circuit.

The foregoing thus describes exemplary embodiments of the present disclosure, but the present disclosure is not limited to the exemplary embodiments, and also includes aspects in which various modifications are made to the exemplary embodiments, and their equivalent technical scope.

INDUSTRIAL APPLICABILITY

The present disclosure may be utilized in applications such as a power conversion device that includes an inverter circuit, and a method of supplying electric power to an inverter circuit.

REFERENCE SIGNS LIST

100 Power conversion device
101 Electric car
102 Power source
111 Power converter
112, 212 Controller
115 Supply switching circuit
116 Inverter circuit
117 Intake wiring
118 Connecting wiring
119 Output wiring
121 Resistor
122 Contactor
123 Main switch
125 Main circuit
126 Filter capacitor
127 Voltage sensor
129 Ground wiring
135 Control calculator
136 Control calculation monitor
137, 237 Memory
138, 238 Supply controller
141 Supply switching circuit controller
142, 242 Incomplete charging detector

The invention claimed is:

1. A power conversion device comprising:
an inverter circuit that comprises a main circuit that converts DC power into output electric power and outputs the output electric power, and a filter capacitor connected in parallel with the main circuit;
a supply switching circuit that comprises a contactor that switches between supplying and not supplying the DC power to the inverter circuit; and
a controller that controls the supply switching circuit;
wherein the controller comprises
a control calculator that outputs a supply signal causing the contactor to supply the DC power,
a memory that holds charge history information comprising a history of incomplete charging in which a charge level of the filter capacitor does not become equal to or greater than a predetermined value after the supply signal is outputted from the control calculator, and
a supply controller that controls the contactor on the basis of the charge history information when the supply signal is outputted from the control calculator.

2. The power conversion device according to claim 1, wherein
when the supply signal is outputted from the control calculator, the supply controller determines whether or not the filter capacitor is in an incomplete charging state on the basis of the charge history information,
in a case of determining that the filter capacitor is not in the incomplete charging state, the supply controller switches the contactor on, and
in a case of determining that the filter capacitor is in the incomplete charging state, the contactor stays open.

3. The power conversion device according to claim 1, wherein
the control calculator comprises
an incomplete charging detector that detects the incomplete charging on the basis of a voltage signal indicating a voltage of the filter capacitor, and
a supply switching circuit controller that outputs the supply signal, and
when the incomplete charging is detected by the incomplete charging detector, the memory stores the detected incomplete charging as the charge history information.

4. The power conversion device according to claim 1, further comprising:
a control calculation monitor that monitors the state of the control calculator, and when detecting a malfunction of the control calculator, makes the control calculator restart;
wherein the control calculator outputs the supply signal to the supply controller if restarted.

5. The power conversion device according to claim 1, wherein
the supply switching circuit further comprises
a resistor connected in series with the contactor, and
a main switch, provided in parallel with the contactor and the resistor, that switches between supplying and not supplying the DC power to the inverter circuit, and
the control calculator outputs the supply signal to the supply controller and also opens the main switch, and
if the charge level of the filter capacitor becomes equal to or greater than the threshold value after the supply signal is outputted, the control calculator closes the main switch and also opens the contactor.

6. The power conversion device according to claim 1, wherein
the charge history information indicates a number of times that the charge level of the filter capacitor does not become equal to or greater than the predetermined value after the supply signal is outputted, and
if the charge level of the filter capacitor does not become equal to or greater than the predetermined value after the supply signal is outputted, the control calculator increments the number of times indicated by the charge history information, and outputs the charge history information indicating the incremented number of times to the memory.

7. The power conversion device according to claim 6, wherein
in a case of acquiring the supply signal, the supply controller determines whether or not the filter capacitor is in the incomplete charging state on the basis of a number of times indicated by the charge history information,
in a case of determining that the filter capacitor is not in the incomplete charging state, the supply controller switches the contactor on, and
in a case of determining that the filter capacitor is in the incomplete charging state, the contactor stays open.

8. The power conversion device according to claim 2, wherein
the control calculator comprises
an incomplete charging detector that detects the incomplete charging on the basis of a voltage signal indicating a voltage of the filter capacitor, and
a supply switching circuit controller that outputs the supply signal, and
when the incomplete charging is detected by the incomplete charging detector, the memory stores the detected incomplete charging as the charge history information.

9. The power conversion device according to claim 2, further comprising:
a control calculation monitor that monitors the state of the control calculator, and when detecting a malfunction of the control calculator, makes the control calculator restart;

wherein the control calculator outputs the supply signal to the supply controller if restarted.

10. The power conversion device according to claim 2, wherein
the supply switching circuit further comprises
a resistor connected in series with the contactor, and
a main switch, provided in parallel with the contactor and the resistor, that switches between supplying and not supplying the DC power to the inverter circuit, and
the control calculator outputs the supply signal to the supply controller and also opens the main switch, and if the charge level of the filter capacitor becomes equal to or greater than the threshold value after the supply signal is outputted, the control calculator closes the main switch and also opens the contactor.

11. The power conversion device according to claim 2, wherein
the charge history information indicates a number of times that the charge level of the filter capacitor does not become equal to or greater than the predetermined value after the supply signal is outputted, and
if the charge level of the filter capacitor does not become equal to or greater than the predetermined value after the supply signal is outputted, the control calculator increments the number of times indicated by the charge history information, and outputs the charge history information indicating the incremented number of times to the memory.

12. The power conversion device according to claim 3, further comprising:
a control calculation monitor that monitors the state of the control calculator, and when detecting a malfunction of the control calculator, makes the control calculator restart;
wherein the control calculator outputs the supply signal to the supply controller if restarted.

13. The power conversion device according to claim 3, wherein
the supply switching circuit further comprises
a resistor connected in series with the contactor, and
a main switch, provided in parallel with the contactor and the resistor, that switches between supplying and not supplying the DC power to the inverter circuit, and
the control calculator outputs the supply signal to the supply controller and also opens the main switch, and if the charge level of the filter capacitor becomes equal to or greater than the threshold value after the supply signal is outputted, the control calculator closes the main switch and also opens the contactor.

14. The power conversion device according to claim 3, wherein
the charge history information indicates a number of times that the charge level of the filter capacitor does not become equal to or greater than the predetermined value after the supply signal is outputted, and
if the charge level of the filter capacitor does not become equal to or greater than the predetermined value after the supply signal is outputted, the control calculator increments the number of times indicated by the charge history information, and outputs the charge history information indicating the incremented number of times to the memory.

15. The power conversion device according to claim 4, wherein
the supply switching circuit further comprises
a resistor connected in series with the contactor, and
a main switch, provided in parallel with the contactor and the resistor, that switches between supplying and not supplying the DC power to the inverter circuit, and
the control calculator outputs the supply signal to the supply controller and also opens the main switch, and if the charge level of the filter capacitor becomes equal to or greater than the threshold value after the supply signal is outputted, the control calculator closes the main switch and also opens the contactor.

16. The power conversion device according to claim 4, wherein
the charge history information indicates a number of times that the charge level of the filter capacitor does not become equal to or greater than the predetermined value after the supply signal is outputted, and
if the charge level of the filter capacitor does not become equal to or greater than the predetermined value after the supply signal is outputted, the control calculator increments the number of times indicated by the charge history information, and outputs the charge history information indicating the incremented number of times to the memory.

17. The power conversion device according to claim 5, wherein
the charge history information indicates a number of times that the charge level of the filter capacitor does not become equal to or greater than the predetermined value after the supply signal is outputted, and
if the charge level of the filter capacitor does not become equal to or greater than the predetermined value after the supply signal is outputted, the control calculator increments the number of times indicated by the charge history information, and outputs the charge history information indicating the incremented number of times to the memory.

18. The power conversion device according to claim 8, further comprising:
a control calculation monitor that monitors the state of the control calculator, and when detecting a malfunction of the control calculator, makes the control calculator restart;
wherein the control calculator outputs the supply signal to the supply controller if restarted.

19. The power conversion device according to claim 8, wherein
the supply switching circuit further comprises
a resistor connected in series with the contactor, and
a main switch, provided in parallel with the contactor and the resistor, that switches between supplying and not supplying the DC power to the inverter circuit, and
the control calculator outputs the supply signal to the supply controller and also opens the main switch, and if the charge level of the filter capacitor becomes equal to or greater than the threshold value after the supply signal is outputted, the control calculator closes the main switch and also opens the contactor.

20. The power conversion device according to claim 8, wherein
the charge history information indicates a number of times that the charge level of the filter capacitor does not become equal to or greater than the predetermined value after the supply signal is outputted, and if the charge level of the filter capacitor does not become equal to or greater than the predetermined value after the supply signal is outputted, the control calculator increments the number of times indicated by the charge history information, and outputs the charge history information indicating the incremented number of times to the memory.

* * * * *